(12) United States Patent
Kuo et al.

(10) Patent No.: US 11,907,468 B2
(45) Date of Patent: Feb. 20, 2024

(54) DISPLAY PANEL AND ELECTRONIC DEVICE

(71) Applicant: Huawei Technologies Co., Ltd., Shenzhen (CN)

(72) Inventors: Tawei Kuo, Shenzhen (CN); Junyong Zhang, Dongguan (CN); Shipeng Chi, Shenzhen (CN); Shiangruei Ouyang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/801,194

(22) PCT Filed: Nov. 24, 2020

(86) PCT No.: PCT/CN2020/131136
§ 371 (c)(1),
(2) Date: Aug. 19, 2022

(87) PCT Pub. No.: WO2021/164359
PCT Pub. Date: Aug. 26, 2021

(65) Prior Publication Data
US 2023/0097832 A1    Mar. 30, 2023

(30) Foreign Application Priority Data

Feb. 21, 2020    (CN) ........................ 202010108792.X

(51) Int. Cl.
*G06F 3/041*    (2006.01)
*G06F 3/044*    (2006.01)

(52) U.S. Cl.
CPC ........ *G06F 3/04164* (2019.05); *G06F 3/0412* (2013.01); *G06F 3/0446* (2019.05)

(58) Field of Classification Search
CPC ... G06F 3/04164; G06F 3/0446; G06F 3/0412
See application file for complete search history.

(56) References Cited

U.S. PATENT DOCUMENTS

| 10,824,258 B2 | 11/2020 | Zou et al. |
| 2008/0137016 A1 | 6/2008 | Kim et al. |

(Continued)

FOREIGN PATENT DOCUMENTS

| CN | 106526995 A | 3/2017 |
| CN | 106707646 A | 5/2017 |

(Continued)

*Primary Examiner* — Peter D McLoone
(74) *Attorney, Agent, or Firm* — Slater Matsil, LLP

(57) ABSTRACT

A display panel includes a display area and a non-display area. The display area includes a touch electrode array consisting of a plurality of touch electrodes, and a plurality of touch signal wires, and the non-display area includes at least two fan-out routing areas. The at least two fan-out routing areas are arranged along a first boundary between the non-display area and the display area, and each fan-out routing area includes a plurality of touch leading wires. The fan-out routing area includes a fan-shaped area and a straight line area, and the fan-shaped area is located between the first boundary and the straight line area. Each touch leading wire includes a first sub-leading wire located in the fan-shaped area and a second sub-leading wire located in the straight line area.

20 Claims, 13 Drawing Sheets

(56) References Cited

U.S. PATENT DOCUMENTS

| | | | |
|---|---|---|---|
| 2011/0080376 A1* | 4/2011 | Kuo | .................... G06F 3/0412 |
| | | | 345/173 |
| 2019/0074328 A1 | 3/2019 | Park | |
| 2019/0129537 A1 | 5/2019 | Yoshida | |
| 2020/0064972 A1* | 2/2020 | Yen | .................... G06F 3/04164 |
| 2020/0110497 A1* | 4/2020 | Jin | ....................... G06F 3/0446 |

FOREIGN PATENT DOCUMENTS

| | | |
|---|---|---|
| CN | 106843616 A | 6/2017 |
| CN | 107300793 A | 10/2017 |
| CN | 108563362 A | 9/2018 |
| CN | 109212852 A | 1/2019 |
| CN | 110412802 A | 11/2019 |
| JP | 2007121687 A | 5/2007 |

\* cited by examiner

DISPLAY PANEL AND ELECTRONIC DEVICE

CROSS-REFERENCE TO RELATED APPLICATIONS

This application is a National Stage of International Application No. PCT/CN2020/131136, filed on Nov. 24, 2020, which claims priority to Chinese Patent Application No. 202010108792.X, filed on Feb. 21, 2020. Both of the aforementioned applications are hereby incorporated by reference in their entireties.

TECHNICAL FIELD

This application relates to the field of display technologies, and more specifically, to a display panel and an electronic device.

BACKGROUND

With the continuous development of display technologies, displays such as liquid crystal displays and organic light-emitting displays continuously emerge, and become mainstream products in the display industry. Beyond that, the displays are undergoing rapid development and transformation. At the same time, requirements of consumers for the displays are increasing. For example, an ultra-high resolution display, a touch display, and a bezel-less screen display become hot spots and important topics in the display field.

Currently, there are two types of solutions to implement a touch function: self-capacitance touch and mutual-capacitance touch. Generally, a total quantity of channel wires in the self-capacitance touch solution is approximately seven times a total quantity of channel wires in the mutual-capacitance touch solution. In this case, a conventional self-capacitance touch solution significantly increases a bezel width of a display panel, and cannot adapt to a current design concept of a narrow bezel. Therefore, a technical problem that urgently needs to be resolved currently is how to provide a display panel and an electronic device to which a self-capacitance touch solution is applied, and design channel wires to reduce space occupied by the channel wires in a non-display area to narrow a bezel.

SUMMARY

In view of this background, this application provides a display panel and an electronic device, to resolve a technical problem of narrowing a bezel.

According to a first aspect, an embodiment of this application provides a display panel, including a display area and a non-display area enclosing the display area.

The display area includes a touch electrode array consisting of a plurality of touch electrodes, and a plurality of touch signal wires, and one touch electrode is electrically connected to at least one touch signal wire. The non-display area includes at least two fan-out routing areas, the at least two fan-out routing areas are arranged along a first boundary between the non-display area and the display area, each fan-out routing area includes a plurality of touch leading wires, and the touch leading wires are electrically connected to the touch signal wires in a one-to-one correspondence. Each fan-out routing area includes a fan-shaped area and a straight line area, and the fan-shaped area is located between the first boundary and the straight line area. Each touch leading wire includes a first sub-leading wire and a second sub-leading wire that are connected to each other, the first sub-leading wire is located in the fan-shaped area, and the second sub-leading wire is located in the straight line area.

A distance between two second sub-leading wires that are adjacent and that are located in different straight line areas is a first distance, a distance between two second sub-leading wires that are adjacent and that are located in a same straight line area is a second distance, and the first distance is greater than the second distance.

Further, the touch electrode array includes a plurality of touch electrode rows and a plurality of touch electrode columns. Each touch electrode row includes a plurality of touch electrodes, and each touch electrode column includes a plurality of touch electrodes. A central axis of the display area is perpendicular to the first boundary. At least some of the plurality of touch signal wires are jump touch signal wires, a shape of the jump touch signal wire is a fold line, the jump touch signal wire includes a start point and an end point, the start point is electrically connected to one touch electrode, and the end point intersects the first boundary.

A distance between the start point and the central axis is a third distance, a distance between the end point and the central axis is a fourth distance, and the third distance is greater than the fourth distance.

Further, the plurality of touch electrode columns include two edge touch electrode columns located at edges of the touch electrode array, and touch signal wires that are electrically connected to at least some touch electrodes in at least one edge touch electrode column are jump touch signal wires.

In some optional implementations, a corner that is of the display area and that is close to a side of the fan-out routing area is an arc corner.

In some implementations, the plurality of touch electrode columns further include a non-edge touch electrode column, the non-edge touch electrode column is located between the two edge touch electrode columns, and touch signal wires that are electrically connected to at least some touch electrodes in the non-edge touch electrode column are jump touch signal wires.

In some implementations, the touch electrode that is electrically connected to the start point and a touch electrode that is adjacent to the end point are located in different touch electrode columns.

In some implementations, the jump touch signal wire includes at least a first wire segment, and the first wire segment is not parallel to the central axis.

In some implementations, the first wire segment is parallel to the first boundary, and the third distance is positively correlated with a distance between the first wire segment and the first boundary.

In some implementations, the touch electrode array includes a first touch electrode column, a second touch electrode column, a third touch electrode column, to an $N^{th}$ touch electrode column that are sequentially arranged, where N is a positive integer. The first touch electrode column is parallel to the central axis, and a distance between the first touch electrode column and the central axis is greater than a distance between any one of the second touch electrode column to the $N^{th}$ touch electrode column and the central axis. Touch signal wires that are electrically connected to a plurality of touch electrodes of an $n^{th}$ touch electrode column are all jump touch signal wires, touch signal wires that are electrically connected to a plurality of touch electrodes of an $(n+1)^{th}$ touch electrode column are all jump touch signal wires, and an end point of the jump touch signal wire is adjacent to an $(n+2)^{th}$ touch electrode column, where n is an odd number, and n<N.

Further, a first touch electrode row in the plurality of touch electrode rows is adjacent to a second touch electrode row in the plurality of touch electrode rows, and the first touch electrode row is adjacent to the first boundary. First wire segments of the jump touch signal wires that are respectively electrically connected to the plurality of touch electrodes of the $n^{th}$ touch electrode column overlap the second touch electrode row, and first wire segments of the jump touch signal wires that are respectively electrically connected to the plurality of touch electrodes of the $(n+1)^{th}$ touch electrode column overlap the first touch electrode row.

Optionally, the jump touch signal wire further includes a second wire segment and a third wire segment that are parallel to the central axis, two ends of the first wire segment are respectively connected to one end of the second wire segment and one end of the third wire segment, the other end of the second wire segment is the start point, and the other end of the third wire segment is the end point; or the jump touch signal wire further includes a fourth wire segment that is parallel to the central axis, one end of the first wire segment is the start point, the other end of the first wire segment is electrically connected to one end of the fourth wire segment, and the other end of the fourth wire segment is the end point.

In some optional implementations, the display panel further includes a substrate layer and a metal routing layer located above the substrate layer, and the metal routing layer includes a first metal routing layer and a second metal routing layer.

At least some of the plurality of touch signal wires include a resistance reduction wire segment, the resistance reduction wire segment includes a first sub-wire segment and a second sub-wire segment that are connected in parallel, and the first sub-wire segment and the second sub-wire segment are respectively located at the first metal routing layer and the second metal routing layer.

In some optional implementations, the display panel further includes a thin film transistor array layer, a display layer, a packaging layer, and a touch electrode layer that are sequentially arranged above the substrate layer, the touch electrode array is located at the touch electrode layer, and the metal wiring layer is located on a side that is of the touch electrode layer and that is away from the packaging layer.

In some optional implementations, a shielded signal wire that is adjacent to the touch leading wire is disposed outside each fan-out routing area.

In some optional implementations, the non-display area further includes a bending area, a bending axis of the bending area is parallel to the first boundary, and the second sub-leading wire passes through the bending area in a direction perpendicular to the first boundary.

Based on a same inventive concept, an embodiment of this application further provides an electronic device, including the display panel provided in any embodiment of this application.

The display panel and the electronic device provided in this application have the following beneficial effects: In embodiments of this application, the touch leading wires are divided into at least two fan-out routing areas for routing, so that a quantity of touch leading wires arranged in each fan-shaped area can be reduced. The touch leading wires are densely arranged in each fan-out routing area, to ensure that any two adjacent touch leading wires are insulated from each other, and a minimum process spacing is satisfied. When it is ensured that total space occupied by all first sub-leading wires is smallest, a width occupied by the fan-shaped areas can be reduced, to facilitate narrowing of the bezel.

BRIEF DESCRIPTION OF THE DRAWINGS

To describe the technical solutions in embodiments of the present invention more clearly, the following briefly describes the accompanying drawings for the embodiments. It is clear that the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

To make the objectives, technical solutions, and advantages of embodiments of the present invention clearer, the following clearly and completely describes the technical solutions in embodiments of the present invention with reference to the accompanying drawings in embodiments of the present invention. It is clear that the described embodiments are some but not all of embodiments of the present invention. All other embodiments obtained by persons skilled in the art based on the embodiments of the present invention without creative efforts shall fall within the protection scope of the present invention.

The terms used in embodiments of the present invention are merely for the purpose of illustrating specific embodiments, and are not intended to limit the present invention. The terms "a", "the" and "this" of singular forms used in embodiments and the appended claims of the present invention are also intended to include plural forms, unless otherwise specified in the context clearly.

Figure 1:
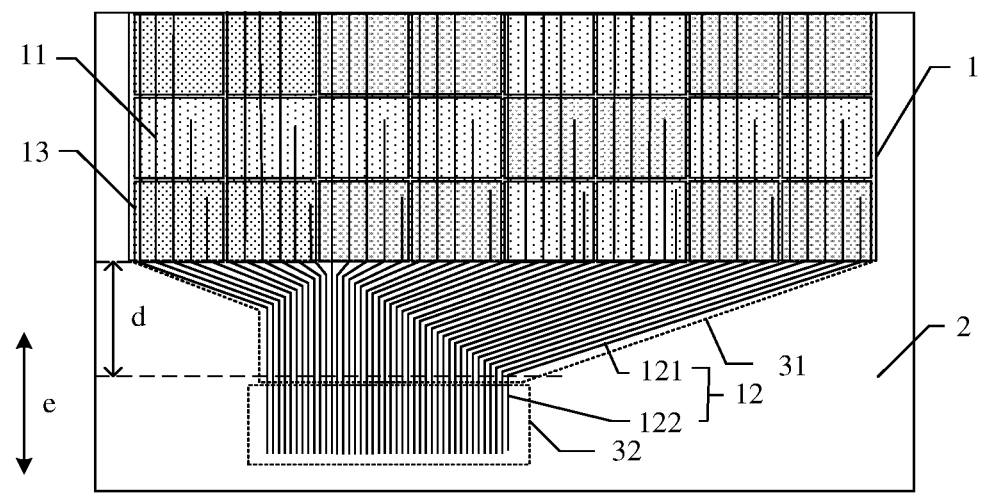
FIG. 1 is a schematic diagram of a display panel in a related technology.

FIG. 1 is a partial schematic diagram of a display panel in a related technology. As shown in FIG. 1, a display area 1 of the display panel includes a plurality of touch signal wires 11 and a plurality of touch electrodes 13. Only a part of the display area 1 and a non-display area 2 enclosing the part of the display area 1 are shown in the figure. The touch signal wires 11 are separately connected to touch leading wire 12 in the non-display area 2. All touch leading wires 12 in the non-display area 2 form a fan-out routing area. The fan-out routing area includes a fan-shaped area 31 and a straight line area 32. After being led out from an edge of the display area 1, all touch leading wires 12 are converged in the straight line area 32 to form a bundle of wires extending in a direction e. The touch leading wire 12 includes a first sub-leading wire 121 located in the fan-shaped area 31 and a second sub-leading wire 122 located in the straight line area 32. The touch leading wires 12 are densely arranged in the fan-out routing area. To ensure that the touch leading wires 12 are insulated from each other and are finally converged into the bundle of wires, the fan-shaped area 31 needs to occupy a specific width d in the width direction e of the non-display area. A large width d limits narrowing of a bezel of the display panel. Based on this, embodiments of this application provide a display panel and an electronic device. An arrangement manner of touch leading wires in a non-display area is designed, to reduce a bezel width occupied by the touch leading wires in the non-display area.

Figure 2:
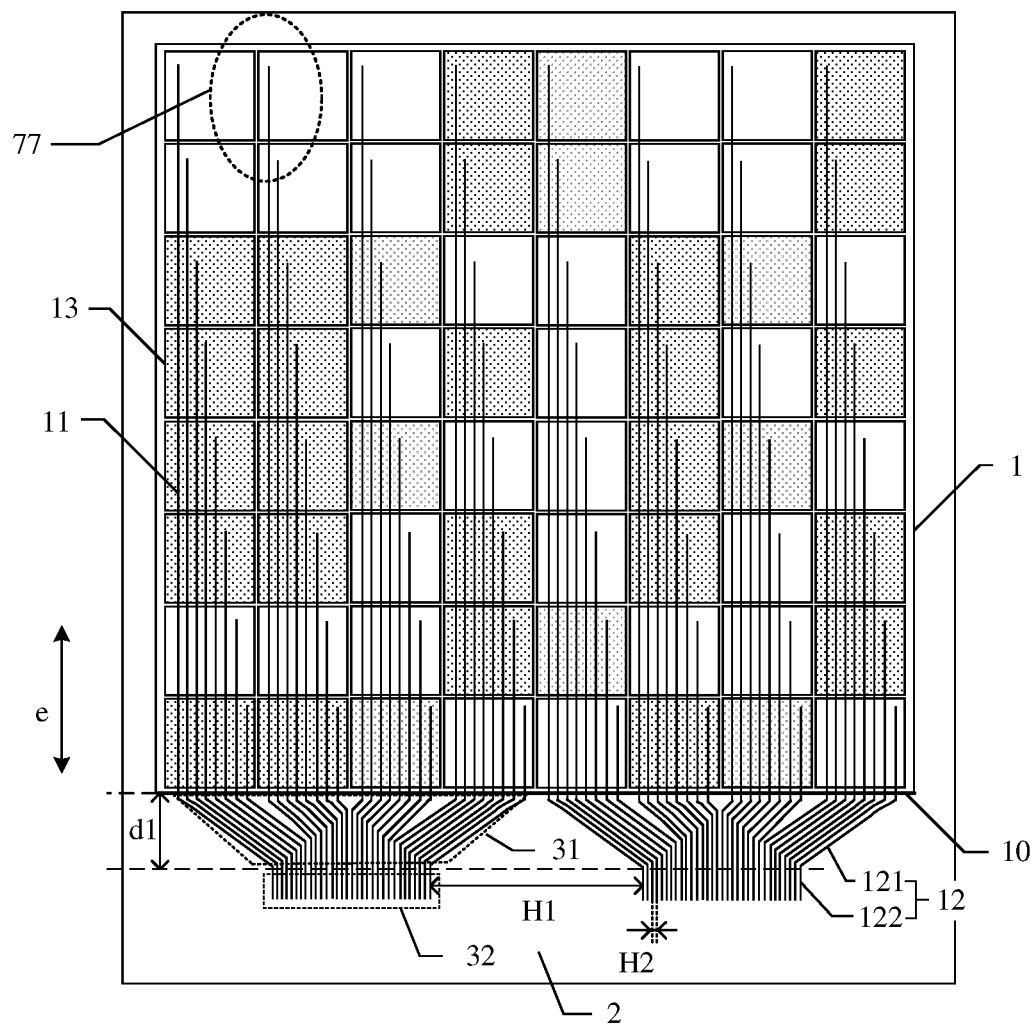
FIG. 2 is a schematic diagram of an optional implementation of a display panel according to an embodiment of this application.

FIG. 2 is a schematic diagram of an optional implementation of a display panel according to an embodiment of this application.

As shown in FIG. 2, the display panel includes a display area 1, and a non-display area 2 enclosing the display area 1. The display area 1 includes: a touch electrode array consisting of a plurality of touch electrodes 13, and a plurality of touch signal wires 11. One touch electrode 13 is electrically connected to at least one touch signal wire 11. The non-display area 2 includes at least two fan-out routing areas, and the at least two fan-out routing areas are arranged along a first boundary 10 between the non-display area 2 and the display area 1. Each fan-out routing area may be close to the first boundary 10, or may be at a specific distance from the first boundary 10, which may be specifically designed based on a requirement. Each fan-out routing area includes a plurality of touch leading wires 12. It should be noted that for a fan-out routing area, the fan-out routing area is only an area occupied by a plurality of densely-arranged touch leading wires. The touch leading wires 12 are electrically connected to the touch signal wires 11 in a one-to-one correspondence. Quantities of touch leading wires 12 in the fan-out routing areas may be the same or may be different. FIG. 2 shows only an example in which the non-display area includes two fan-out routing areas. It should be noted that a non-display area 2 in all embodiments of the present invention may alternatively not enclose a display area 1. For example, the non-display area 2 is located only on one side of the display area 1, or is located only on two opposite sides of the display area 1. A non-display area on any side of the display area 1 includes the at least two fan-out routing areas in this embodiment of the present invention.

Each fan-out routing area includes a fan-shaped area 31 and a straight line area 32. The fan-shaped area 31 is located between the first boundary 10 and the straight line area 32. A width of the fan-shaped area 31 in a direction e is d1. Each touch leading wire 12 includes a first sub-leading wire 121 and a second sub-leading wire 122 that are connected to each other. The first sub-leading wire 121 is located in the fan-shaped area 31, and the second sub-leading wire 122 is located in the straight line area 32. In other words, as defined in this application, the fan-shaped area 31 is an area occupied by a plurality of densely-arranged first sub-leading wires 121, and the straight line area is an area occupied by a plurality of densely-arranged second sub-leading wires 122 in a same direction.

In this embodiment of this application, two ends of the first sub-leading wire 121 are respectively connected to the touch signal wire 11 and the second sub-leading wire 122, and the second sub-leading wire 122 is connected to a pin of a drive chip (not shown in the figure), so that in a touch detection phase, the touch signal wire 11 transmits a signal to the drive chip through the touch leading wire 12. Each touch electrode in the touch electrode array forms a capacitance to the ground. When a finger touches the display panel, a finger capacitance is added to a capacitance formed by a touch electrode, so that a change is generated in a capacitance of the touch electrode to the ground. A touch location of the finger is determined based on a location of the touch electrode at which a capacitance change is detected, to implement a touch function.

A distance between two second sub-leading wires 122 that are adjacent and that are located in different straight line areas 32 is a first distance H1, a distance between two second sub-leading wires 122 that are adjacent and that are located in a same straight line area 32 is a second distance H2, and the first distance H1 is greater than the second distance H2. It can also be seen from the schematic diagram in FIG. 2 that the first distance H1 is obviously greater than the second distance H2. In this embodiment of this application, after the touch leading wires 12 electrically connected to the touch signal wires 11 are led out from the first boundary 10, the touch leading wires 12 are divided into at least two fan-out routing areas in the non-display area 2 for routing, and a plurality of touch leading wires in each fan-out routing area are gradually converged into one bundle of wires.

In a panel manufacturing process, a touch leading wire is usually manufactured by using an etching process. To ensure that touch leading wires manufactured at a same layer of metal are insulated from each other, a spacing between two adjacent touch leading wires is greater than or equal to a minimum process spacing. If the spacing is less than the minimum process spacing, poor etching may exist in the etching process, resulting in a short circuit between the two adjacent touch leading wires. The minimum process spacing is related to a material used for the touch leading wire, a thickness of the touch leading wire, a photoresist and an etching solution used in a touch leading wire etching process, and the like. Generally, to ensure that total space occupied by all touch leading wires is the smallest to reduce space of the non-display area, a plurality of touch leading wires are arranged densely, to ensure that adjacent touch leading wires are insulated from each other and the minimum process spacing is satisfied.

Figure 3:
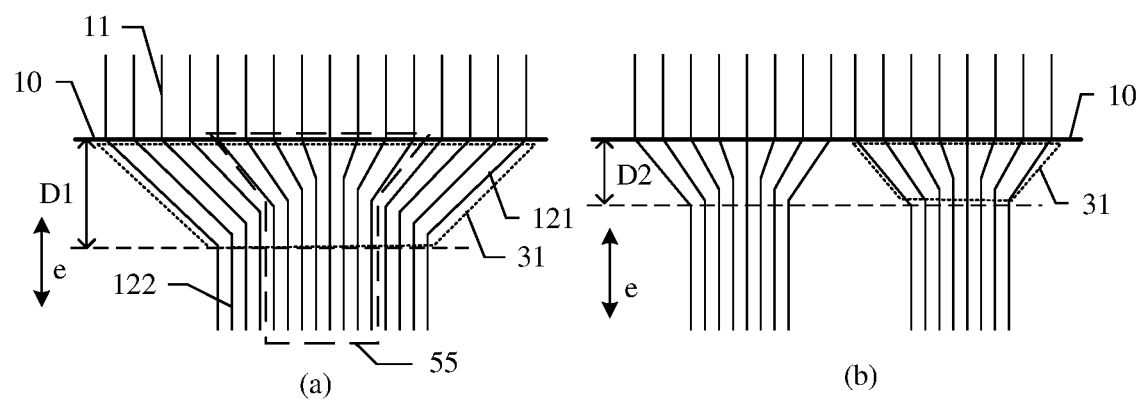
FIG. 3 is a principle diagram 1 of an embodiment of this application.

FIG. 3 is a principle diagram 1 of an embodiment of this application. As shown in FIG. 3, only a touch signal wire 11 in a display area and a touch leading wire in a non-display area are shown in a simplified manner. The touch leading wire includes a first sub-leading wire 121 in a fan-shaped area 31 and a second sub-leading wire 122 in a straight line area (not marked in the figure). In a cabling manner of the touch leading wire shown in FIG. 3, a shape of a part of the first sub-leading wire in the fan-shaped area 31 is a fold line. In an actual product, there are a large quantity of touch leading wires. For principle description, only 16 touch leading wires are used as an example. (a) in FIG. 3 is a schematic diagram in which 16 touch leading wires are arranged densely in one fan-out routing area in a related technology, and a width occupied by a fan-shaped area 31 in a direction e is D1. (b) in FIG. 3 is a schematic diagram in which 16 touch leading wires are disposed in two fan-out routing areas and are densely arranged after a solution of this application is used, and a width occupied by a fan-shaped area 31 in a direction e is D2.

In both the related technology and the solution of this application, after the touch leading wires are led out from a first boundary 10, the touch leading wires are gradually converged to the middle to form one bundle of wires. When a same manufacturing process is used in both FIG. (a) and FIG. (b), a same minimum process spacing between two adjacent touch leading wires is used in a touch leading wire etching process. In the solution (b) of this application, the 16 touch leading wires are disposed in the two fan-out routing areas and arranged. Therefore, a quantity of touch leading wires in each fan-out routing area is less than 16. In the figure, an example in which each fan-out routing area includes eight touch leading wires is used only for description. When a same manufacturing process is used in both the solution (b) of this application and the related technology (a), a spacing between adjacent second sub-leading wires 122 in the solution (b) of this application is the same as a spacing between adjacent second sub-leading wires 122 in the related technology (a), and a plurality of first sub-leading wires 121 in a same fan-shaped area 31 in the solution (b) of this application are densely arranged. It is assumed that an arrangement manner of the touch leading wires in the related technology (a) is as follows: when the touch leading wires are insulated from each other and a minimum process spacing is satisfied, a manufacturing process can achieve a minimum space occupied by the fan-shaped area 31. In this case, an arrangement manner of the eight touch leading wires in each fan-out routing area in the solution (b) of this application may be the same as an arrangement manner of eight touch leading wires (an area 55 marked by dashed lines in the figure) in the middle of the fan-out routing area in the related technology (a). It can be seen that the width D2 occupied by the fan-shaped area 31 in the direction e in the solution (b) of this application is less than the width D1 occupied by the fan-shaped area 31 in the direction e in the related technology (a). In this application, after the touch leading wires in the non-display area are divided into the two fan-out routing areas for routing, the width occupied by the fan-shaped area can be obviously reduced, to facilitate narrowing of a bezel.

Figure 4:
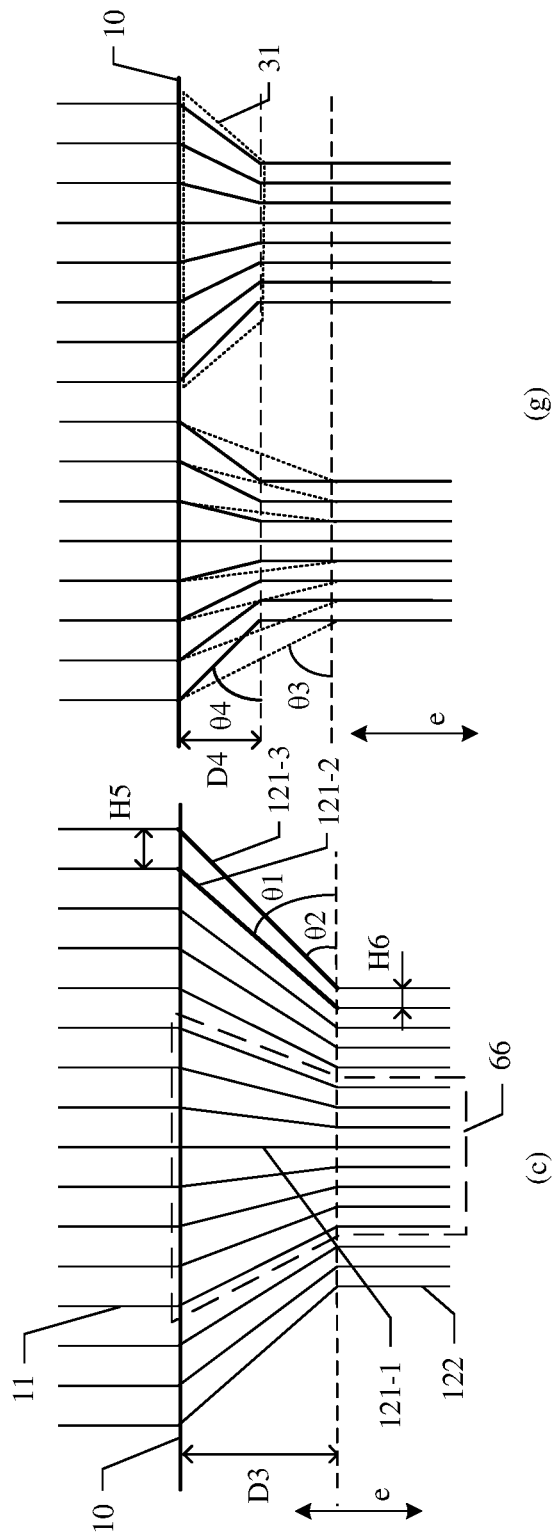
FIG. 4 is a principle diagram 2 of an embodiment of this application.

FIG. 4 is a principle diagram 2 of an embodiment of this application. As shown in FIG. 4, only a touch signal wire 11 in a display area and a touch leading wire in a non-display area are shown in a simplified manner. The touch leading wire includes a first sub-leading wire 121 in a fan-shaped area 31 and a second sub-leading wire 122 in a straight line area (not marked in the figure). Different from the cabling manner of the touch leading wire in FIG. 3, a shape of the first sub-leading wire 121 in the fan-shaped area 31 in FIG. 4 is a slash. (c) in FIG. 4 is a schematic diagram in which 16 touch leading wires are arranged densely in one fan-out routing area in a related technology, and a width occupied by a fan-shaped area 31 in a direction e is D3. (g) in FIG. 4 is a schematic diagram in which 16 touch leading wires are disposed in two fan-out routing areas and are densely arranged after a solution of this application is used, and a width occupied by a fan-shaped area 31 in a direction e is D4.

As shown in the related technology (c) in FIG. 4, a spacing between two adjacent touch signal wires 11 is H5, and a spacing between two adjacent second sub-leading wires 122 in a straight line area is H6, where H5>H6. (c) in FIG. 4 further shows a center first sub-leading wire 121-1 located at the center of the fan-shaped area. A first sub-leading wire 121 that is father away from the center first sub-leading wire 121-1 have a smaller included angle with a horizontal direction in the figure, and a spacing between two adjacent first sub-leading wires 121 is larger in a direction farther away from the center first sub-leading wire 121-1. It should be noted that, as shown in the figure, the spacing between two adjacent first sub-leading wires 121 gradually changes along the direction e, that is, there is a maximum spacing and a minimum spacing between two adjacent first sub-leading wires 121. Therefore, for two first sub-leading wires 121-2 and 121-3 that are closest to an outer side of the fan-out routing area, θ1>θ2. In addition, to ensure that adjacent first sub-leading wires are insulated from each other and total space occupied by all first sub-leading wires is smallest, a minimum spacing between the first sub-leading wire 121-2 and the first sub-leading wire 121-3 is a minimum process spacing.

When the 16 touch leading wires are disposed in the two fan-out routing areas and arranged by using the solution of this application, a quantity of touch leading wires in each fan-out routing area is less than 16. In FIG. 4, an example in which each fan-out routing area includes eight touch leading wires is used only for description. Assuming that it is still the same as the principle description of FIG. 3, an arrangement manner of the eight touch leading wires in each fan-out routing area is the same as an arrangement manner of eight touch leading wires (an area 66 marked by dashed lines in the figure) in the middle of the fan-out routing area in the related technology (c), which can be seen from dashed lines in the solution (g) of this application, a width occupied by the fan-shaped area in the direction e cannot be reduced. This is because in the arrangement manner of first sub-leading wires shown by using the dashed lines, a minimum spacing between two outermost dashed-line first sub-leading wires in the fan-shaped area is greater than the minimum process spacing. An included angle between the outermost dashed-line first sub-leading wire and the horizontal direction is θ3, and θ3>θ2. When a solution design of this application is used, and a same manufacturing process in the related technology is used in the solution of this application, a minimum process spacing in the solution (g) of this application is the same as the minimum process spacing in the related technology (c). Therefore, in the solution (g) of this application, an included angle between the outermost first sub-leading wire in the fan-shaped area and the horizontal direction is θ4. θ4 is set to approximately equal to θ2. In this case, it can be ensured that a minimum spacing between two outermost adjacent first sub-leading wires in the fan-shaped area is approximately equal to the minimum process spacing, so that adjacent first sub-leading wires are insulated from each other, and total space occupied by all first sub-leading wires is smallest. In this solution (g) of this application, the width occupied by the fan-shaped area in the direction e is D4, D4<D3. In this application, after the touch leading wires in the non-display area are divided into the two fan-out routing areas for routing, the width occupied by the fan-shaped area can be obviously reduced, to facilitate narrowing of a bezel.

In embodiments of this application, the touch leading wires are divided into at least two fan-out routing areas for routing, so that a quantity of touch leading wires arranged in each fan-shaped area can be reduced. The touch leading wires are densely arranged in each fan-out routing area, to ensure that any two adjacent touch leading wires are insulated from each other, and the minimum process spacing is satisfied. When it is ensured that total space occupied by all first sub-leading wires is smallest, a width occupied by the fan-shaped areas can be reduced, to facilitate narrowing of the bezel.

It should be noted that, in principle descriptions of FIG. 3 and FIG. 4, two arrangement manners of first sub-leading wires in a fan-shaped area are provided. In one arrangement manner, at least some of a plurality of first sub-leading wires in a fan-shaped area are fold lines, and in the other arrangement manner, all of a plurality of first sub-leading wires in a fan-shaped area are slashes. Both the foregoing two arrangement manners are applicable to this application, and only one of the arrangement manners is used for illustration in a specific embodiment.

Figure 5:
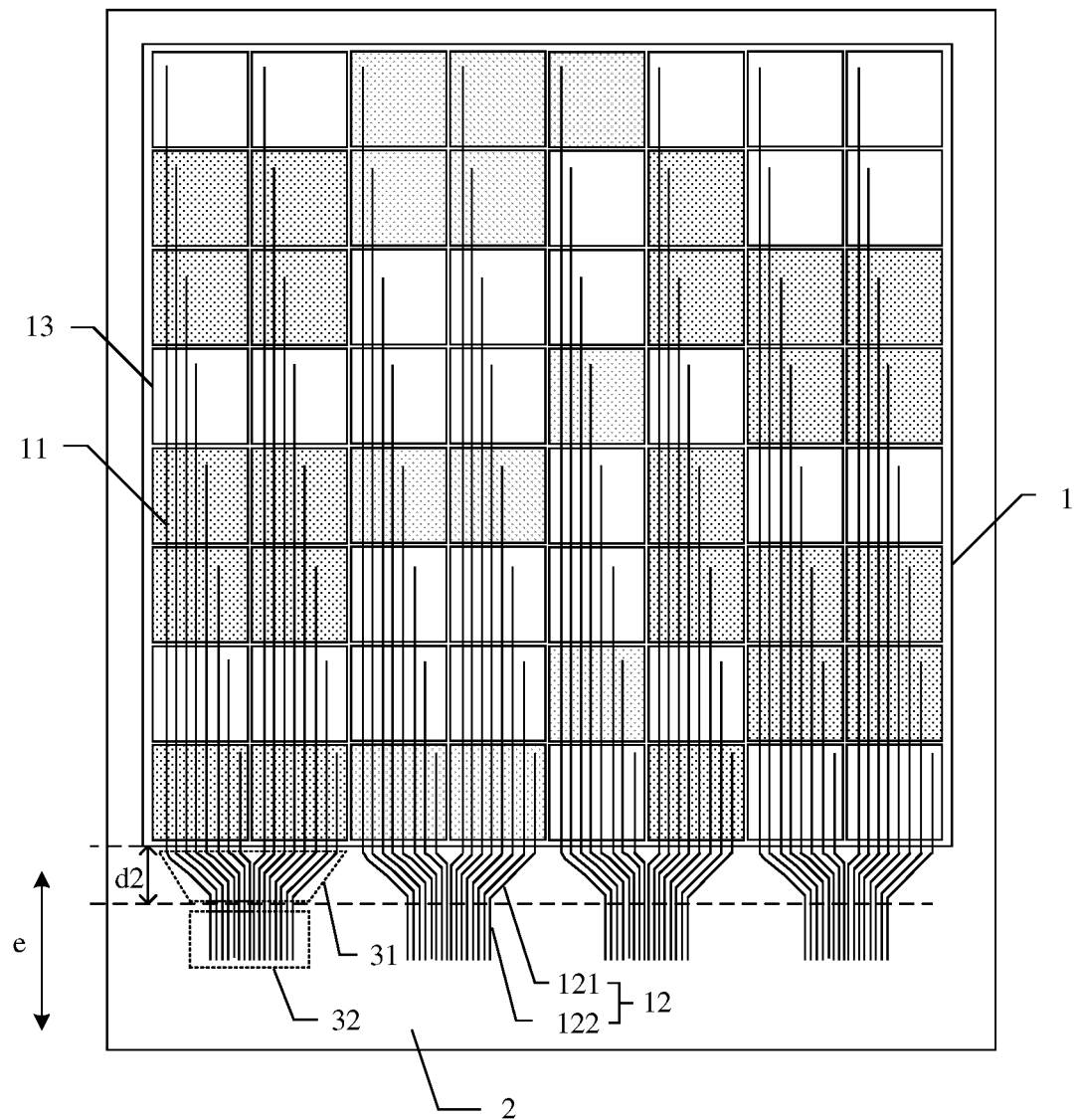
FIG. 5 is a schematic diagram of another optional implementation of a display panel according to an embodiment of this application.

In an embodiment, FIG. 5 is a schematic diagram of another optional implementation of a display panel according to an embodiment of this application. A non-display area 2 includes four fan-out routing areas arranged along a first boundary 10. The fan-out routing area is an area occupied by a plurality of densely-arranged touch leading wires, and a width occupied by a fan-shaped area 31 in a direction e is d2. When a total quantity of touch leading wires is fixed, a larger quantity of fan-out routing areas included in the non-display area 2 indicates a smaller quantity of touch leading wires disposed in each fan-out routing area, and correspondingly, a quantity of touch leading wires arranged in each fan-shaped area is smaller. It can be learned from the foregoing principle descriptions in FIG. 3 and FIG. 4 that a smaller quantity of touch leading wires are arranged in each fan-shaped area facilitate reducing of the width occupied by the fan-shaped area in the direction e. In an actual product, a quantity of fan-out routing areas in the non-display area may be designed based on a specific manufacturing process and a design requirement, to ensure that a bezel can be narrowed while manufacturing process complexity is not increased.

Figure 6:
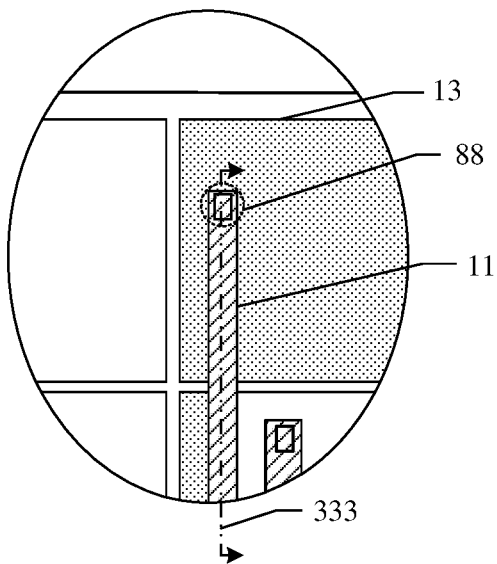
FIG. 6 is an enlarged schematic diagram of an area 77 in FIG. 2.
Figure 7:
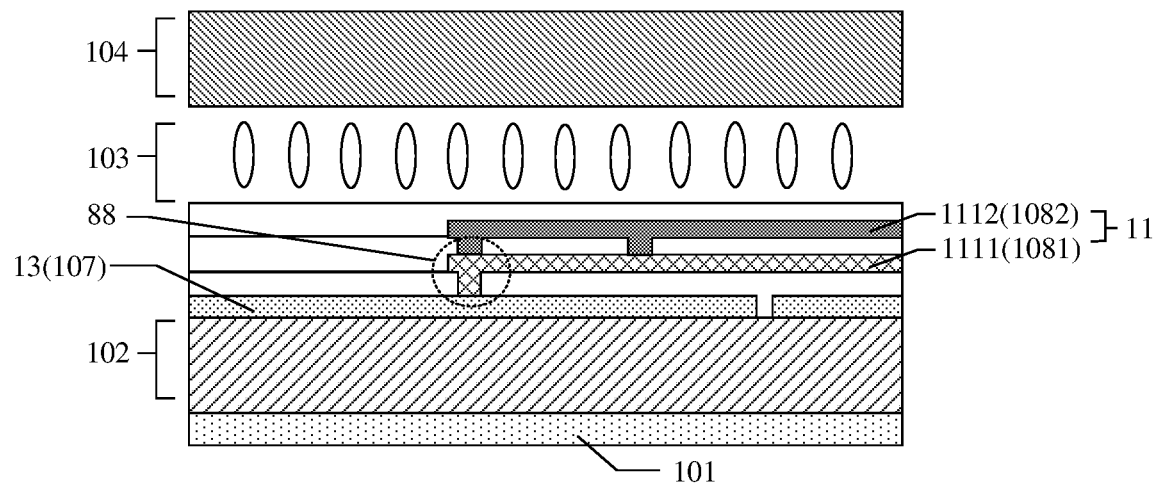
FIG. 7 is a schematic diagram of a cross section of a tangent line 333 in FIG. 6.
Figure 8:
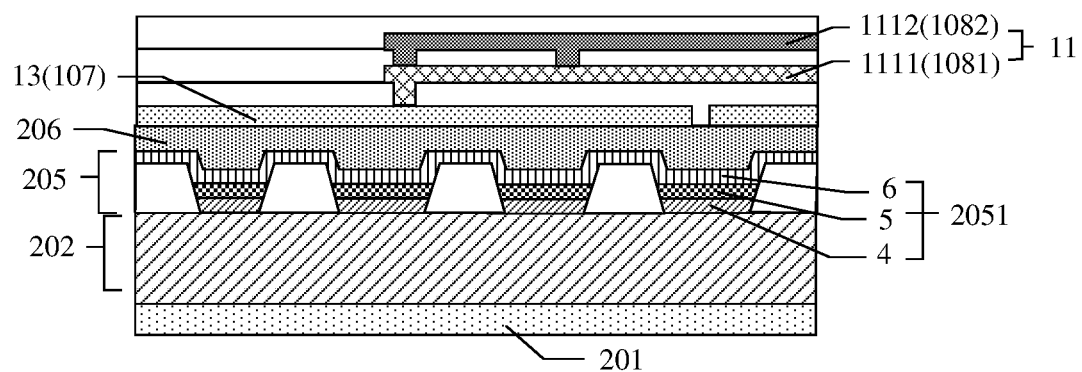
FIG. 8 is a schematic diagram of another cross section of the tangent line 333 in FIG.

The display panel provided in this embodiment of this application is applicable to a liquid crystal display panel, and is also applicable to an organic light-emitting display panel. FIG. 6 is an enlarged schematic diagram of an area 77 in FIG. 2. FIG. 7 is a schematic diagram of a cross section of a tangent line 333 in FIG. 6. FIG. 8 is a schematic diagram of another cross section of the tangent line 333 in FIG. 6.

As shown in FIG. 6, the touch signal wire 11 is connected to the touch electrode 13 through a via hole 88.

FIG. 7 shows that the display panel provided in this embodiment of this application is a liquid crystal display panel. As shown in FIG. 7, the display panel includes a substrate layer 101, a thin film transistor array layer 102, a liquid crystal layer 103, and a color filter substrate 104. The substrate layer 101 is configured to support the thin film transistor array layer 102, and the substrate layer 101 may be a glass substrate. The thin film transistor array layer 102 includes a plurality of thin film transistors, configured to form a pixel circuit that controls light emitting of pixels on the display panel. The liquid crystal layer 103 is filled with liquid crystal molecules, and the color filter substrate 104 includes a color resistance layer and a black matrix, which are not shown in the figure. The display panel further includes a touch electrode layer 107 and a metal routing layer that are located on a side that is of the thin film transistor array layer 102 and that is away from the substrate layer 101, the touch electrode 13 is located at the touch electrode layer 107, and the touch signal wire 11 is located at the metal routing layer. As shown in the figure, the metal routing layer includes a first metal routing layer 1081 and a second metal routing layer 1082. Relative locations of the first metal routing layer 1081 and the second metal routing layer 1082 in the figure are merely examples. An insulation layer (not marked in the figure) is disposed between adjacent metal layers. Some wire segments of the touch signal wire are resistance reduction wire segments. The resistance reduction wire segment includes a first sub-wire segment 1111 and a second sub-wire segment 1112 that are connected in parallel. The first sub-wire segment 1111 and the second sub-wire segment 1112 are respectively located at the first metal routing layer 1081 and the second metal routing layer 1082. A resistance reduction wire segment is shown in the figure. The first sub-wire segment 1111 and the second sub-wire segment 1112 are connected through via holes at least at two locations, and the first sub-wire segment 1111 is electrically connected to the touch electrode 13 through the via hole 88 at the insulation layer. The resistance reduction wire segment formed by connecting the first sub-wire segment and the second sub-wire segment in parallel can reduce resistance, that is, can reduce resistance on the touch signal wire, to reduce a voltage drop on the touch signal wire, thereby reducing power consumption of the display panel. Optionally, the touch electrode may be multiplexed as a common electrode in the panel for use. A manufacturing material of the touch electrode may include an indium tin oxide.

In another embodiment, the display panel is a liquid crystal display panel, only one metal layer routing layer is disposed above a touch electrode layer, and all touch signal wires are located at a same metal routing layer. Using one metal layer to manufacture the touch signal wires can reduce a film layer thickness of the display panel, which is not shown herein.

FIG. 8 shows that the display panel provided in this embodiment of this application is an organic light-emitting display panel. As shown in FIG. 8, the display panel includes a substrate layer 201, and a thin film transistor array layer 202, a display layer 205, a packaging layer 206, and a touch electrode layer 107 that are sequentially arranged above the substrate layer 201. The touch electrode 13 is located at the touch electrode layer 107, and a metal routing layer is located on a side that is of the touch electrode layer 107 and that is away from the packaging layer 206. The substrate layer 201 may be a rigid substrate, or may be a flexible substrate. The thin film transistor array layer 202 includes a plurality of thin film transistors, configured to form a pixel circuit that controls light emitting of pixels on the display panel. The display layer 205 includes a plurality of light-emitting components 2051. The light-emitting component 2051 includes an anode 4, a light-emitting layer 5, and a cathode 6 that are stacked in sequence. The packaging layer 206 is configured to package the display layer 205, to isolate water and oxygen and ensure a service life of the light emitting component 2051. Optionally, the packaging layer 206 includes two inorganic packaging layers and an organic packaging layer located between the inorganic packaging layers. As shown in the figure, the metal routing layer includes a first metal routing layer 1081 and a second metal routing layer 1082. Relative locations of the first metal routing layer 1081 and the second metal routing layer 1082 in the figure are merely examples. An insulation layer (not marked in the figure) is disposed between adjacent metal layers. At least some wire segments of the touch signal wire are resistance reduction wire segments. The resistance reduction wire segment includes a first sub-wire segment 1111 and a second sub-wire segment 1112 that are connected in parallel. The first sub-wire segment 1111 and the second sub-wire segment 1112 are respectively located at the first metal routing layer 1081 and the second metal routing layer 1082. A resistance reduction wire segment 111 is shown in the figure. The first sub-wire segment 1111 and the second sub-wire segment 1112 are connected through via holes at least at two locations, and the first sub-wire segment 1111 is electrically connected to the touch electrode 13 through a via hole at the insulation layer. The resistance reduction wire segment formed by connecting the first sub-wire segment and the second sub-wire segment in parallel can reduce resistance, that is, can reduce resistance on the touch signal wire, to reduce a voltage drop on the touch signal wire, thereby reducing power consumption of the display panel.

In another embodiment, the display panel is an organic light-emitting display panel, only one metal layer routing layer is disposed above a touch electrode layer, and all touch signal wires are located at a same metal routing layer. Using one metal layer to manufacture the touch signal wires can reduce a film layer thickness of the display panel, which is not shown herein.

In this application, a manufacturing material of the touch electrode layer includes one or more of metal molybdenum, metal aluminum, and metal titanium, and a manufacturing material of the metal routing layer includes one or more of metal molybdenum, metal aluminum, and metal titanium. Optionally, the touch electrode layer is made of single-layer metal molybdenum, or three-layer metal titanium-aluminum-titanium, or three-layer metal molybdenum-aluminum-molybdenum. The metal routing layer is made of single-layer metal molybdenum, or three-layer metal titanium-aluminum-titanium, or three-layer metal molybdenum-aluminum-molybdenum.

Figure 9:
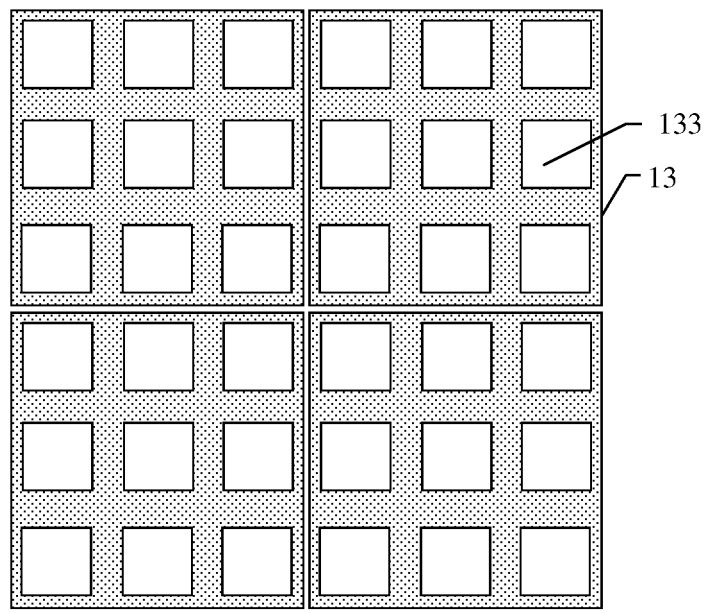
FIG. 9 is a partial schematic top view of another optional implementation of a display panel according to an embodiment of this application.

Further, in an embodiment, FIG. 9 is a partial schematic top view of another optional implementation of a display panel according to an embodiment of this application. As shown in FIG. 9, only some of touch electrodes 13 in a touch electrode array are shown. The touch electrode 13 includes a plurality of openings 133, and the openings 133 penetrate the touch electrode 13 in a thickness direction of the touch electrode 13. A shape of the opening in the figure is merely an example. In the organic light-emitting display panel, the touch electrode is located above the display layer (refer to the foregoing schematic diagram of FIG. 8), and light emitted by the light-emitting component can be emitted out of the display panel only after passing through a film layer at which the touch electrode is located. In this embodiment of this application, the plurality of openings are disposed on the touch electrode, to form a grid-shaped touch electrode. Some light emitted by a light-emitting component can be emitted out of the display panel through the openings, to reduce light loss when light passes through a film layer. Therefore, when the touch electrode is made of a metal material, the touch electrode does not block light output of the light-emitting component, light output efficiency of the light-emitting component can be ensured, and impact on brightness of the display panel is avoided.

Optionally, quantities of touch leading wires in fan-out routing areas are the same. When cabling is performed according to the two arrangement manners shown in the foregoing principle descriptions in FIG. 3 and FIG. 4, it can be ensured that widths occupied by fan-shaped areas in the fan-out routing areas are basically the same in a direction e, to save space occupied by the fan-shaped areas, and help narrow a bezel.

Optionally, each fan-out routing area has a central axis, so that the touch leading wires are properly arranged, and it is ensured that the widths occupied by the fan-shaped areas are basically the same in the direction e.

Figure 10:
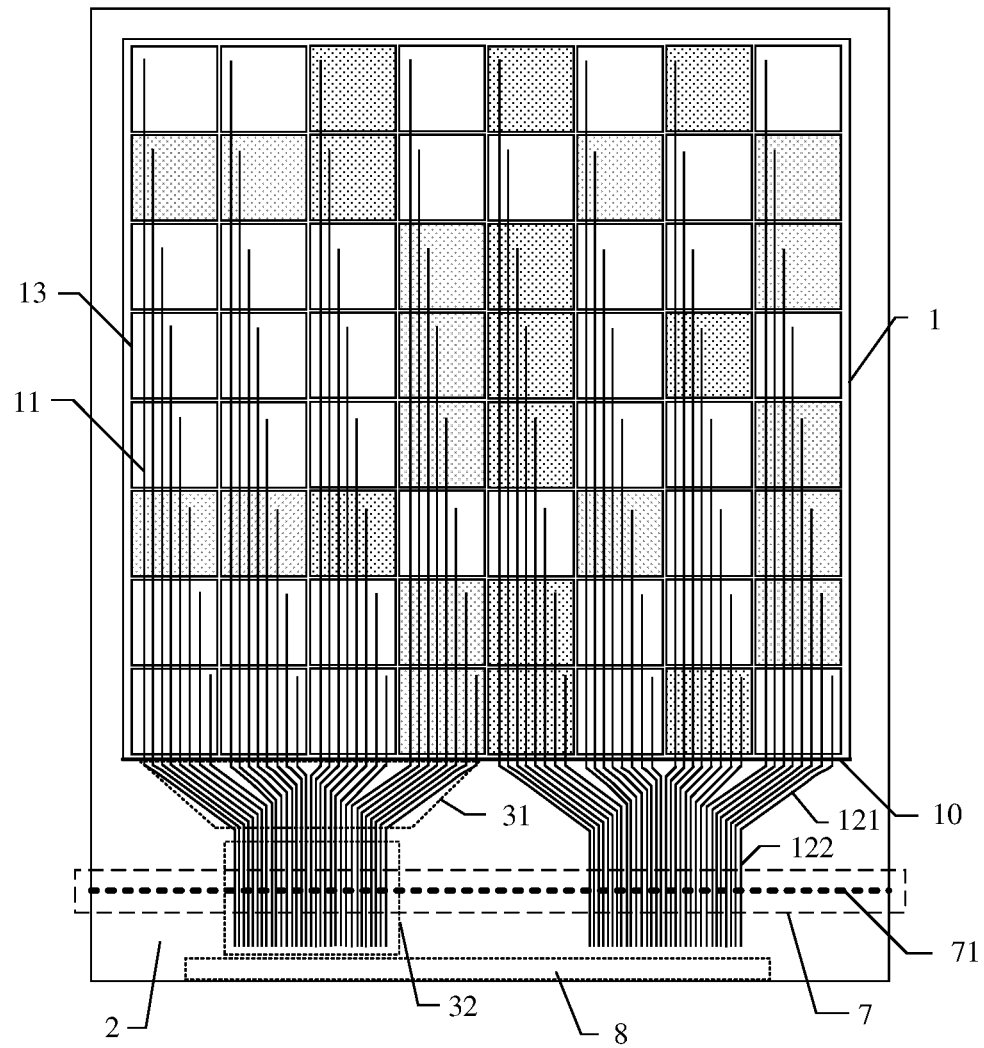
FIG. 10 is a partial schematic diagram of another optional implementation of a display panel according to an embodiment of this application.
Figure 11:
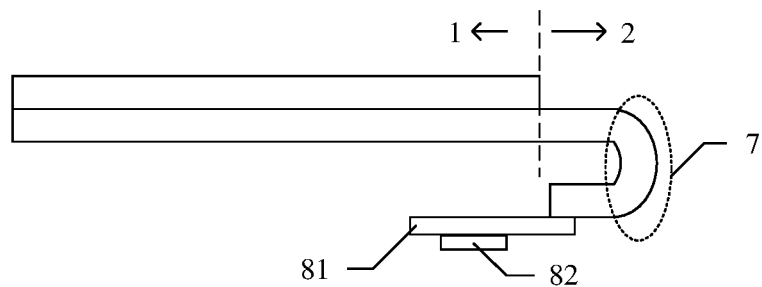
FIG. 11 is a simplified schematic diagram of a bending area in FIG. 10 in a bent state.

In an embodiment, FIG. 10 is a partial schematic diagram of another optional implementation of a display panel according to an embodiment of this application. FIG. 11 is a simplified schematic diagram of a bending area in FIG. 10 in a bent state. As shown in FIG. 10, a non-display area 2 further includes the bending area 7, a bending axis 71 of the bending area 7 is parallel to a first boundary 10, a second sub-leading wire 122 passes through the bending area 7 in a direction perpendicular to the first boundary 10, the bending axis 71 is a virtual axis rather than a physical structure in the display panel, and the bending area 7 can be bent along the bending axis 71. A binding area 8 is further disposed on a side that is of the bending area 7 and that is away from a display area 1. The binding area 8 is configured to bind a flexible circuit board. A drive chip may be fixed on the flexible circuit board, to implement a connection between the drive chip and the display panel. The bending area 7 can be bent. As shown in FIG. 11, after being bent with the bending area, the flexible circuit board 81 bound to the drive chip 82 can be disposed on a side that is of the display panel and that is away from a display surface. When the bending area is in the bent state, the drive chip is located on a back side rather than a front side of the display panel, to further narrow the bezel of the display panel.

Figure 12:
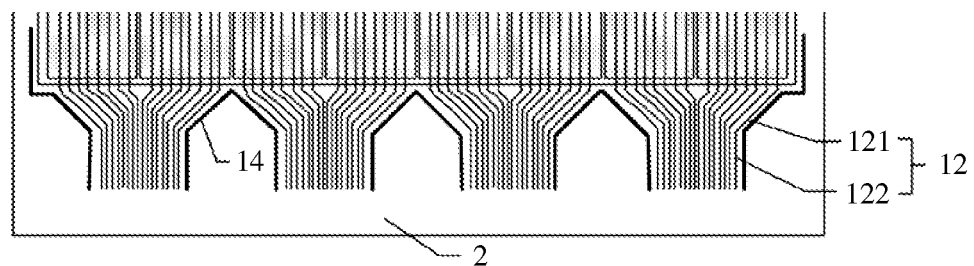
FIG. 12 is a partial schematic diagram of another optional implementation of a display panel according to an embodiment of this application.
Figure 13:
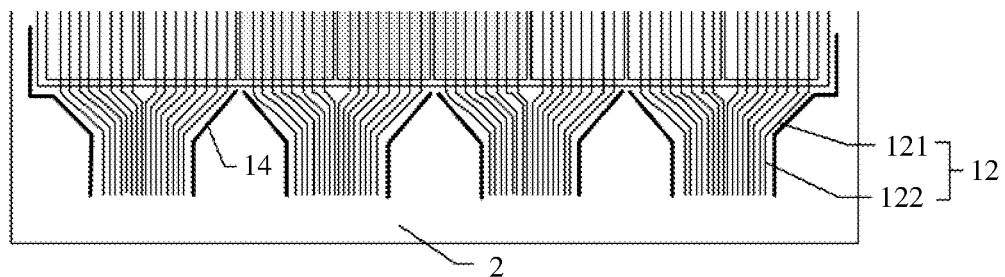
FIG. 13 is a partial schematic diagram of another optional implementation of a display panel according to an embodiment of this application.

In an embodiment, FIG. 12 is a partial schematic diagram of another optional implementation of a display panel according to an embodiment of this application. FIG. 13 is a partial schematic diagram of another optional implementation of a display panel according to an embodiment of this application. FIG. 12 and FIG. 13 each shows an example in which the non-display area 2 includes four fan-out routing areas. One fan-out routing area is an area occupied by a plurality of densely-arranged touch leading wires. A shielded signal wire 14 that is adjacent to the touch leading wire is disposed on an outer side of each fan-out routing area. FIG. 12 shows that two shielded signal wires 14 that are between two adjacent fan-out routing areas and that are respectively adjacent to two touch leading wires located in different fan-out routing areas are connected to each other. FIG. 13 shows that a shielded signal wire 14 that is disposed on an outer side of a fan-out routing area is not connected to another shielded signal wire. A manner of disposing the shielded signal wire may be set based on a specific process requirement. In application of the panel, a direct current voltage signal passes through the shielded signal wire 14, or the shielded signal wire 14 is grounded, or a voltage signal the same as a voltage signal of a touch electrode may pass through the shielded signal wire 14. The shielded signal wire 14 can be used to shield signals and effectively isolate signal crosstalk of the display panel. The shielded signal wire 14 may be electrically connected to a drive chip (for example, the drive chip described in the foregoing embodiment in FIG. 10), and the drive chip supplies a voltage signal to the shielded signal wire 14; or the shielded signal wire 14 is electrically connected to a mainboard by using a flexible circuit board, and the mainboard directly supplies a signal to the shielded signal wire 14.

Figure 14:
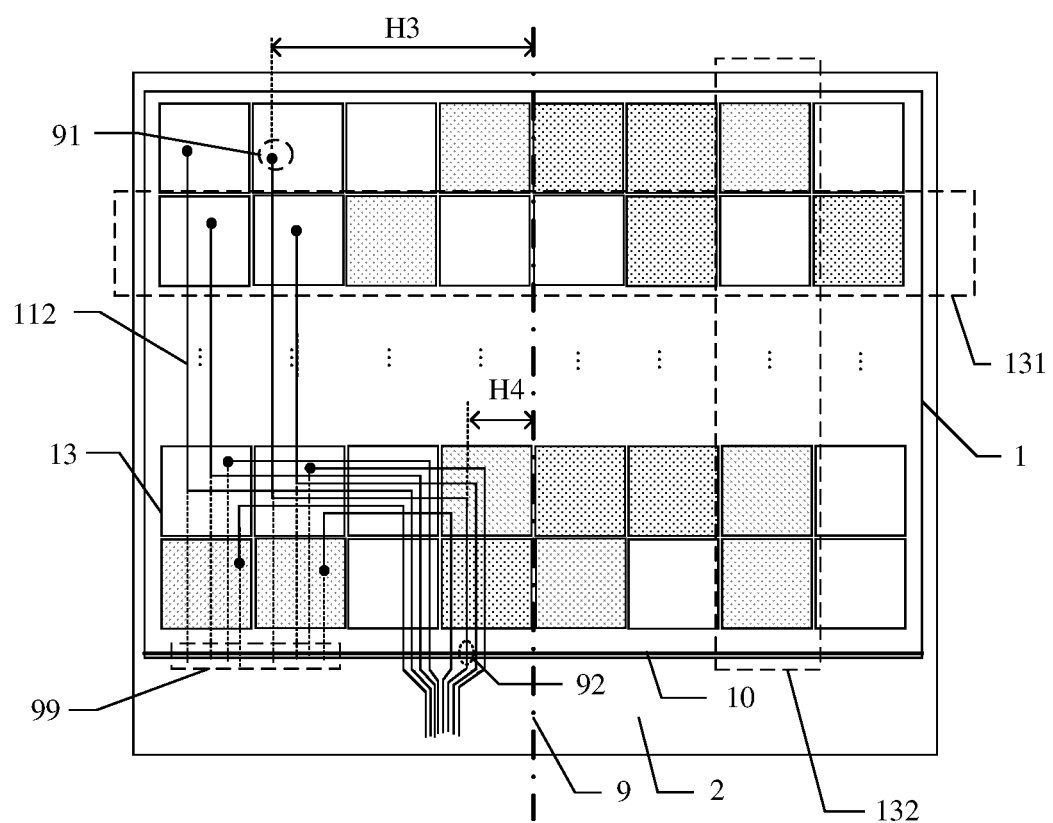
FIG. 14 is a simplified schematic diagram of another optional implementation of a display panel according to an embodiment of this application.

Further, FIG. 14 is a simplified schematic diagram of another optional implementation of a display panel according to an embodiment of this application. As shown in FIG. 14, a touch electrode array includes a plurality of touch electrode rows 131 and a plurality of touch electrode columns 132. Each touch electrode row 131 includes a plurality of touch electrodes 13, and each touch electrode column 132 includes a plurality of touch electrodes 13. A central axis 9 of a display area 1 is perpendicular to a first boundary 10.

At least some of a plurality of touch signal wires are jump touch signal wires 112, and a shape of the jump touch signal wire is a fold line. To clearly show a manner of disposing the jump touch signal wire 112, only some touch signal wires are shown as jump touch signal wires 112 in the figure. The jump touch signal wire includes a start point 91 and an end point 92. The start point 91 is electrically connected to one touch electrode 13, and the end point 92 intersects with the first boundary 10. A distance between the start point 91 and the central axis 9 of the display area 1 is a third distance H3, a distance between the end point 92 and the central axis 9 is a fourth distance H4, and the third distance H3 is greater than the fourth distance H4. As shown in the figure, a location at which the jump touch signal wire 112 extends out of the display area shifts toward the central axis 9. In other words, the start point of the jump touch signal wire defined in this application is a location point at which the jump touch signal wire is electrically connected to the touch electrode, and the end point of the jump touch signal wire is an end point of the jump touch signal wire in the display area when the jump touch signal wire extends toward a non-display area in which a touch leading wire is disposed.

In a related technology, an extension direction of a touch signal wire is basically parallel to the central axis 9. After being electrically connected to a touch electrode, the touch signal wire directly extends to the first boundary 10 between the display area 1 and the non-display area 2 in a direction parallel to the central axis 9 (for example, an area 99 framed by dashed lines in FIG. 14 is a location of end points of touch signal wires in the display area in the related technology). The end points of the touch signal wires in the display area 1 are basically evenly distributed on the first boundary 10 between the display area 1 and the non-display area 2, and corresponding connection locations of touch leading wires and the touch signal wires are also evenly distributed on the first boundary 10. Then, a plurality of touch leading wires are gradually converged into a bundle of wires. The manner of disposing the touch signal wires in the related technology affects utilization of space of a bottom bezel. However, in this embodiment of this application, the at least some of the plurality of touch signal wires are the jump touch signal wires. As shown in FIG. 14, end points of the jump touch signal wires in the display area shift toward the central axis 9, and a fan-out routing area formed by the jump touch signal wires also approaches the central axis 9. Therefore, a total width occupied by all fan-out routing areas in a direction parallel to the first boundary 10 can be reduced, and space of the non-display area is further reduced.

Figure 15:
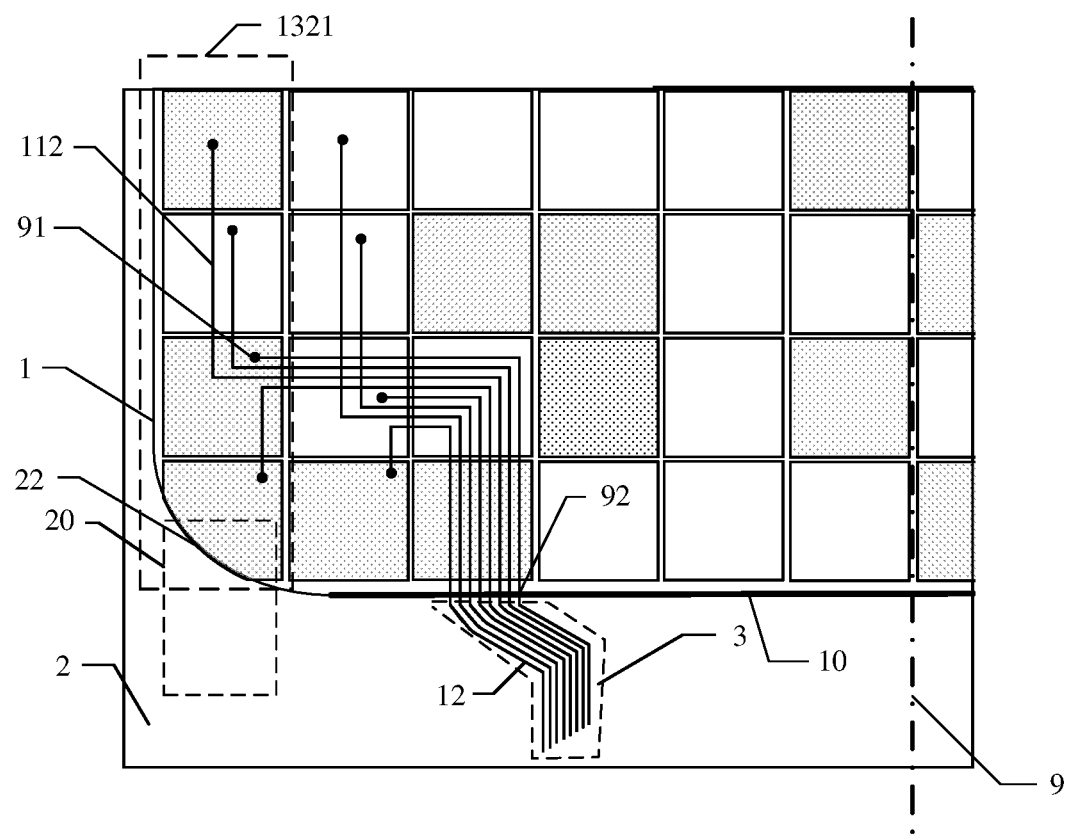
FIG. 15 is a partial schematic diagram of another optional implementation of a display panel according to an embodiment of this application.

In an embodiment, FIG. 15 is a partial schematic diagram of another optional implementation of a display panel according to an embodiment of this application. As shown in FIG. 15, a plurality of touch electrode columns include two edge touch electrode columns 1321 located at edges of the touch electrode columns. Only one edge touch electrode column 1321 is shown in the figure. The edge touch electrode column 1321 is parallel to a central axis 9 of a display area 1. Touch signal wires electrically connected to at least some touch electrodes in at least one edge touch electrode column 1321 are jump touch signal wires 112. Only some touch electrodes 13 in the edge touch electrode column 1321 are shown in the figure. For one jump touch signal wire 112, a distance between a start point 91 of the jump touch signal wire 112 and the central axis 9 of the display area 1 is greater than a distance between an end point 92 of the jump touch signal wire 112 and the central axis 9. Locations of the jump touch signal wires 112 extending from the display area 1 shift toward the central axis 9. These jump touch signal wires do not need to be led out from a location of an area 20 in the figure and connected to touch leading wires in a non-display area. As shown in the figure, corresponding touch leading wires 12 also approach the central axis 9 (which may also be understood with reference to the foregoing embodiment description in FIG. 14). In this case, a quantity of touch leading wires disposed in the non-display area at the location of the area 20 in the figure can be reduced. Alternatively, all touch signal wires electrically connected to touch electrodes in edge touch electrodes are jump touch signal wires, and no touch leading wire needs to be disposed in the non-display area 20. Therefore, space of a non-display area adjacent to a corner 22 of the display area can be reduced.

Further, still refer to FIG. 15. The corner 22 that is of the display area 1 and that is close to a side of a fan-out routing area 3 is an arc corner. According to a design of the jump touch signal wires in this embodiment of this application, space of the non-display area adjacent to the corner 22 of the display area can be reduced, and a shape of the non-display area adjacent to the corner may be designed to adapt to a shape of the corner. In this case, the shape of the non-display area adjacent to the corner 22 may be designed as an arc shape based on the shape of the corner 22, so that a bezel area adjacent to the arc corner of the display area can be narrowed.

Figure 16:
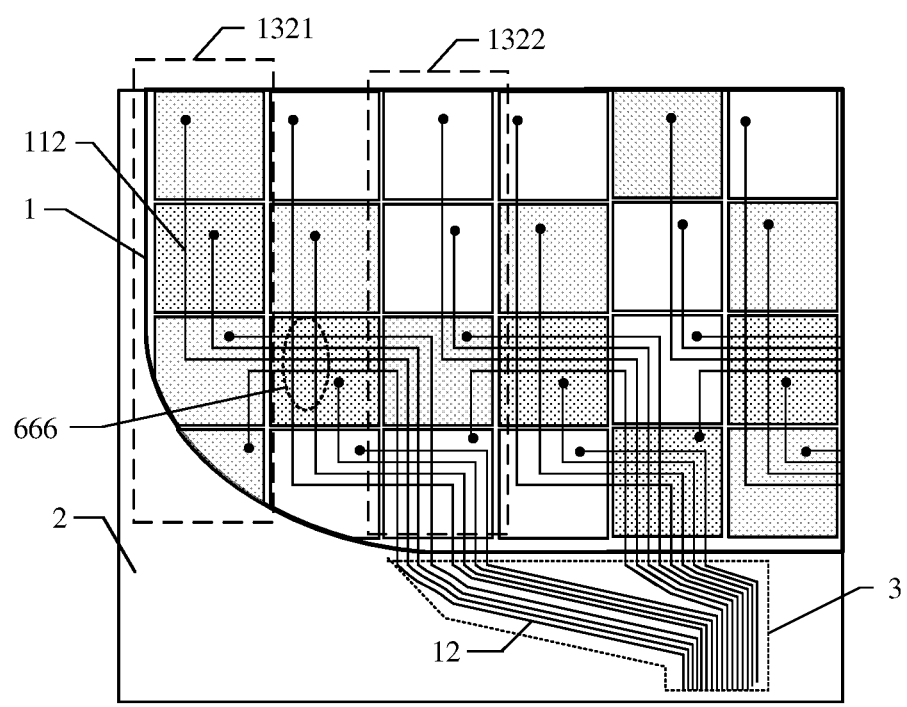
FIG. 16 is a partial schematic diagram of another optional implementation of a display panel according to an embodiment of this application.

In an embodiment, FIG. 16 is a partial schematic diagram of another optional implementation of a display panel according to an embodiment of this application. As shown in FIG. 16, a plurality of touch electrode columns include a non-edge touch electrode column 1322, and the non-edge touch electrode column 1322 is located between two edge touch electrode columns 1321. A partial schematic diagram in the figure shows only one edge touch electrode column 1321 and a non-edge touch electrode column 1322 located between the edge touch electrode column 1321 and a central axis (not shown in the figure) of a display screen. Touch signal wires that are electrically connected to at least some touch electrodes in the non-edge touch electrode column 1322 are jump touch signal wires 112. The figure shows that both the edge touch electrode column 1321 and the non-edge touch electrode column 1322 have corresponding jump touch signal wires 112. A shape of the jump touch signal wire 112 is a fold line, and a distance between a start point of the jump touch signal wire and the central axis is greater than a distance between an end point of the jump touch signal wire and the central axis. As shown in FIG. 16, when the jump touch signal wire 112 is designed as a fold line, to ensure that a center of the jump touch signal wire 112 shifts toward the central axis, two jump touch signal wires in a display area 1 may cross due to different routing directions. As shown in the figure, jump touch signal wires cross each other in an area 666 framed by dashed lines. When the two jump touch signal wires that cross each other are manufactured by using a same metal layer, to implement mutual insulation between the two jump touch signal wires at a crossing location, a cross-bridge line design may be used. One of the jump touch signal wires is set to be broken at the crossing location, and then the broken jump touch signal wire is connected by using a cross-bridge line at another metal layer. When the two jump touch signal wires that cross each other are manufactured by using different metal layers, even if the two jump touch signal wires cross due to different routing directions, the two jump touch signal wires are still insulated at a crossing location. In this embodiment of this application, a film layer location and an arrangement manner of the jump touch signal wires are designed, so that an end point of a jump touch signal wire at each location shifts toward the central axis in the display area, so that a fan-out routing area formed by corresponding touch leading wires also approaches the central axis, and a total width occupied by all fan-out routing areas in a direction parallel to a first boundary can be reduced, to reduce space of a non-display area.

Further, a touch electrode that is electrically connected to the start point of the jump touch signal wire and a touch electrode that is adjacent to the end point of the jump touch signal wire (for example, the touch electrode is closest to the end point, or is overlapped by the end point in a direction perpendicular to the panel but is not electrically connected to the end point) are located in different touch electrode columns. Specifically, refer to the foregoing schematic diagram in FIG. 14. There is one touch electrode column 132 between the touch electrode 13 that is electrically connected to the start point of the jump touch signal wire 112 and a touch electrode 13 that is adjacent to the end point of the jump touch signal wire 112, and an amount of shift of the end point of the jump touch signal wire shifting toward the central axis 9 is at least a width of one touch electrode column. In an actual product, a quantity of touch electrode columns between the touch electrode 13 electrically connected to the start point of the jump touch signal wire 112 and the touch electrode 13 adjacent to the end point of the jump touch signal wire 112 may be selected based on a specific design requirement.

Figure 17:
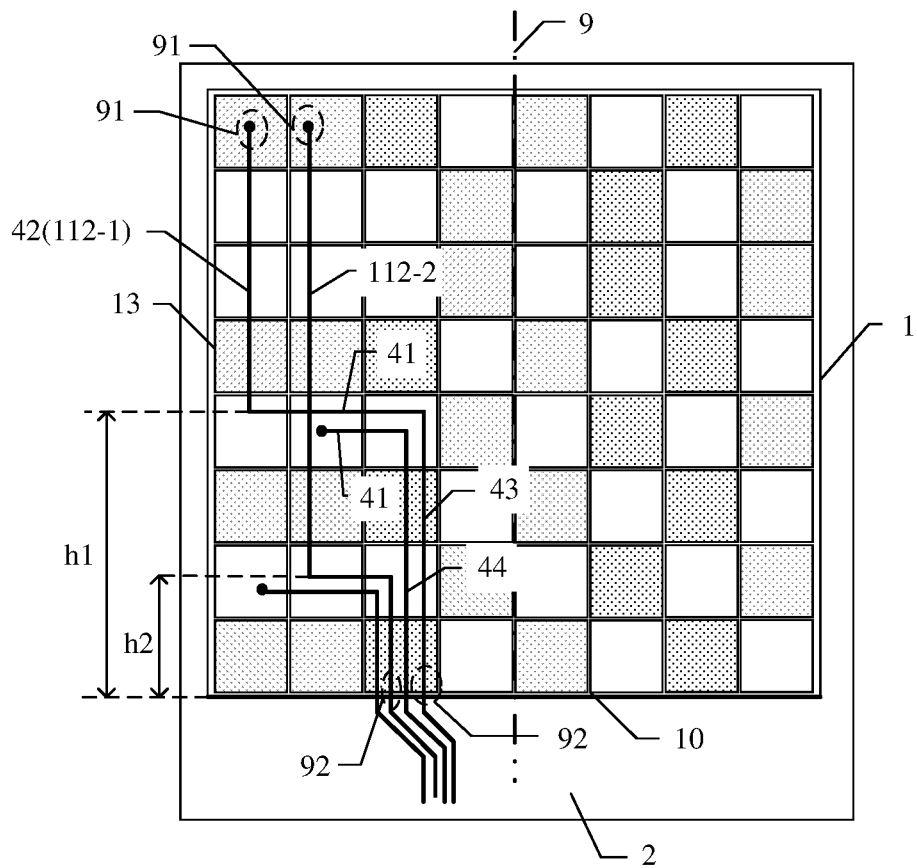
FIG. 17 is a partial schematic diagram of another optional implementation of a display panel according to an embodiment of this application.

In this embodiment of this application, a shape of the jump touch signal wire is a fold line, and the jump touch signal wire includes at least a first wire segment. The first wire segment is not parallel to the central axis of the display area. In other words, the first wire segment is perpendicular to the central axis, or an extension line of the first wire segment forms an included angle with the central axis. FIG. 17 is a partial schematic diagram of another optional implementation of a display panel according to an embodiment of this application. Only some of jump touch signal wires are shown. A shape of a jump touch signal wire is a fold line, and each jump touch signal wire includes a first wire segment 41. For example, the first wire segment 41 is substantially perpendicular to a central axis 9 in the figure. In a related technology, an extension direction of a touch signal wire located in a display area is basically parallel to a central axis of the display area. However, in this embodiment of this application, it is set that the jump touch signal wire includes the first wire segment, and the first wire segment can change a routing direction of the jump touch signal wire in a display area, so that an end point of the jump touch signal wire shifts toward the central axis. In addition, a longer length of the first wire segment 41 indicates a larger amount of shift of an end point of the jump touch signal wire toward the central axis of the display area, and a touch leading wire connected to the jump touch signal wire shifts toward an extension line of the central axis 9, so that a fan-out routing area formed by the touch leading wires also approaches the central axis, and a total width occupied by all fan-out routing areas in a direction parallel to a first boundary can be reduced.

Still refer to FIG. 17. A jump touch signal wire 112 includes a first-type jump touch signal wire and a second-type jump touch signal wire. The first-type jump touch signal wire includes a first wire segment 41, and a second wire segment 42 and a third wire segment 43 that are parallel to the central axis 9 of a display area. Two ends of the first wire segment 41 are respectively connected to one end of the second wire segment 42 and one end of the third wire segment 43, the other end of the second wire segment 42 is a start point 91 of the jump touch signal wire, and the other end of the third wire segment 43 is an end point 92 of the jump touch signal wire. The end point 92 is an end point of the jump touch signal wire in a display area 1. After being led out from a location at which the first-type jump touch signal wire is electrically connected to a touch electrode 13, the first-type jump touch signal wire is first routed in a direction parallel to the central axis 9, then a routing direction turns and extends toward the central axis 9, and then the routing direction turns again and extends to a first boundary 10 between the display area 1 and a non-display area 2 in a direction parallel to the central axis 9.

The second-type jump touch signal wire includes a first wire segment 41 and a fourth wire segment 44 parallel to the central axis 9 of the display area. One end of the first wire segment 41 is a start point 91 of the jump touch signal wire, the other end of the first wire segment 41 is electrically connected to one end of the fourth wire segment 44, and the other end of the fourth wire segment 44 is an end point 92 of the jump touch signal wire. After being led out from a location at which the second-type jump touch signal wire is electrically connected to a touch electrode 13, the second-type jump touch signal wire is first routed toward the central axis 9, then a routing direction turns and extends to the first boundary 10 between the display area 1 and the non-display area 2 in the direction parallel to the central axis 9.

By using a routing manner of the first-type jump touch signal wire or a routing manner of the second-type jump touch signal wire, a location of the end point of the touch signal wire in the display area shifts toward the central axis, so that a leading wire connected to the touch signal wire also shifts toward the extension line of the central axis, and a fan-out routing area formed by a plurality of touch leading wires also approaches the extension line of the central axis. Therefore, a total width occupied by all fan-out routing areas in the direction parallel to the first boundary can be reduced, and space of the non-display area is reduced. In an actual panel, the routing manner of the first-type jump touch signal wire or the routing manner of the second-type jump touch signal wire may be properly used based on a specific requirement, to arrange and design touch signal wires in the display area.

There are a large quantity of touch signal wires in an actual panel. For example, a touch electrode array in a display area is an 18*40 array. In this case, the touch electrode array includes 18 touch electrode rows and 40 touch electrode columns. Correspondingly, there are 40 touch signal wires corresponding to one touch electrode column, and a total quantity of touch signal wires is 40*18=720. When a jump routing design is used for the touch signal wires, some of the touch signal wires may cross each other. Crossing means that two touch signal wires cross each other after extending to a same location in the display area due to different extension directions. To avoid a short circuit caused by crossing between the touch signal wires, at the cross location, the touch signal wires may be disposed at different metal layers, or a cross-bridge design is used to avoid a short circuit. For details, refer to the description in the embodiment in FIG. 16. Details are not described herein again.

In some optional implementations, the first wire segment of the jump touch signal wire is parallel to the first boundary, and a third distance between the start point of the jump touch signal wire and the central axis is positively correlated with a distance between the first wire segment and the first boundary. That is, if a distance between a touch electrode column and the central axis is longer, a distance between a first wire segment of a jump touch signal wire electrically connected to a touch electrode in the touch electrode column and the first boundary is longer. The display panel shown in FIG. 17 is used for description. Refer to a jump touch signal wire 112-1 and a jump touch signal wire 112-2 shown in the figure. A distance between a start point 91 of the jump touch signal wire 112-1 and the central axis 9 is greater than a distance between a start point 91 of the jump touch signal wire 112-2 and the central axis 9. A distance between a first wire segment 41 of the jump touch signal wire 112-1 and the first boundary 10 is h1, and a distance between a first wire segment 41 of the jump touch signal wire 112-2 and the first boundary 10 is h2, where h1>h2. The implementation can simplify a routing manner of the touch signal wire in a jump routing area, and reduce a quantity of crossing times between jump touch signal wires. The jump routing area is an area in which the first wire segments are located and an area in which some touch wire segments between the end points and the first wire segments are located.

In an embodiment, a touch electrode array includes a first touch electrode column, a second touch electrode column, a third touch electrode column, to an $N^{th}$ touch electrode column that are sequentially arranged, where N is a positive integer. The first touch electrode column is parallel to a central axis, and a distance between the $N^{th}$ touch electrode column and the central axis is less than a distance between the first touch electrode column and the central axis.

Figure 18:
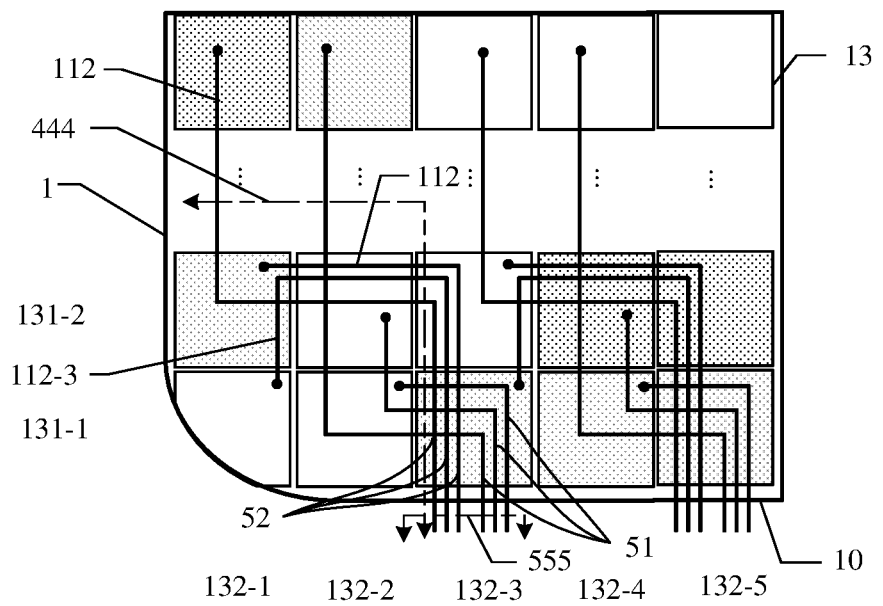
FIG. 18 is a partial schematic diagram of a display panel according to an embodiment of this application.

Touch signal wires that are electrically connected to a plurality of touch electrodes of an $n^{th}$ touch electrode column are all jump touch signal wires, touch signal wires that are electrically connected to a plurality of touch electrodes of an $(n+1)^{th}$ touch electrode column are all jump touch signal wires, and an end point of the jump touch signal wire is adjacent to an $(n+2)^{th}$ touch electrode column, where n is an odd number, and n<N. FIG. 18 is used below as an example for description.

FIG. 18 is a partial schematic diagram of a display panel according to an embodiment of this application. A touch electrode array includes a first touch electrode column 132-1, a second touch electrode column 132-2, a third touch electrode column 132-3, a fourth touch electrode column 132-4, and a fifth touch electrode column 132-5 that are sequentially arranged. End points of jump touch signal wires that are electrically connected to touch electrodes in the first touch electrode column 132-1 and the second touch electrode column 132-2 are all adjacent to the third touch electrode column 132-3, and the end point of the jump touch signal wire is a point at which the jump touch signal wire intersects a first boundary 10, which is not shown in the figure. End points of jump touch signal wires that are electrically connected to touch electrodes in the third touch electrode column 132-3 and the fourth touch electrode column 132-4 are all adjacent to the fifth touch electrode column 132-5. The rest can be deduced in the same manner. In the implementation, a regular jump routing design is applied to the jump touch signal wires. Both an end point of a jump touch signal wire connected to a touch electrode in an odd-numbered touch electrode column and an end point of a jump touch signal wire connected to a touch electrode in an even-numbered touch electrode column are adjacent to a same touch electrode column. The regular design can relatively simplify an overall routing manner of the jump touch signal wires, and can reduce a quantity of overlapping times of the jump touch signal wires in a jumping routing area, helping simplify a manufacturing process.

Still refer to FIG. 18. A plurality of touch electrode rows include a first touch electrode row 131-1 and a second touch electrode row 131-2 that are adjacent to each other, and the first touch electrode row 131-1 is adjacent to the first boundary 10. First wire segments 41 of jump touch signal wires 112 that are respectively electrically connected to a plurality of touch electrodes 13 in the first touch electrode column 132-1 and the third touch electrode column 132-3 (that is, an $n^{th}$ touch electrode column, where n is an odd number) overlap the second touch electrode row 131-2. First wire segments 41 of jump touch signal wires 112 that are respectively electrically connected to a plurality of touch electrodes 13 of the second touch electrode column 132-2 and the fourth touch electrode column 132-4 (that is, an $(n+1)^{th}$ touch electrode column) overlap the first touch electrode row 131-1. That is, a touch signal wire electrically connected to a touch electrode in the $n^{th}$ touch electrode column starts to be turned at a corresponding location in the second touch electrode row and is routed toward the central axis of a display area, and a touch signal wire electrically connected to a touch electrode in the $(n+1)^{th}$ touch electrode column starts to be turned at a corresponding location in the first touch electrode row and is routed toward the central axis of the display area. Only an area in which the first touch electrode row and the second touch electrode row are located in the display area are occupied as a jump routing area of jump touch signal wires, and the jump routing area occupies a small area. The jump routing area is an area in which the first wire segments are located and an area in which some touch wire segments between the end points and the first wire segments are located.

In addition, touch signal wires outside the jump routing area may be all designed as resistance reduction wire segments, so that resistance on touch signal wires can be greatly reduced, thereby further reducing power loss. In addition, as shown in FIG. 18, after a jump touch signal wire 112-3 is led out from a touch electrode 13 electrically connected to the jump touch signal wire 112-3, the jump touch signal wire 112-3 needs to be pulled up first, and then starts to be turned. In the manner in this embodiment of this application, a distance of pulling up a jump touch signal wire that is electrically connected to a touch electrode in the first touch electrode row 131-1 is short, and a setting manner of pulling jump touch signal wires can be simplified, thereby reducing crossing between the jump touch signal wires, and simplifying a manufacturing process.

Figure 19:
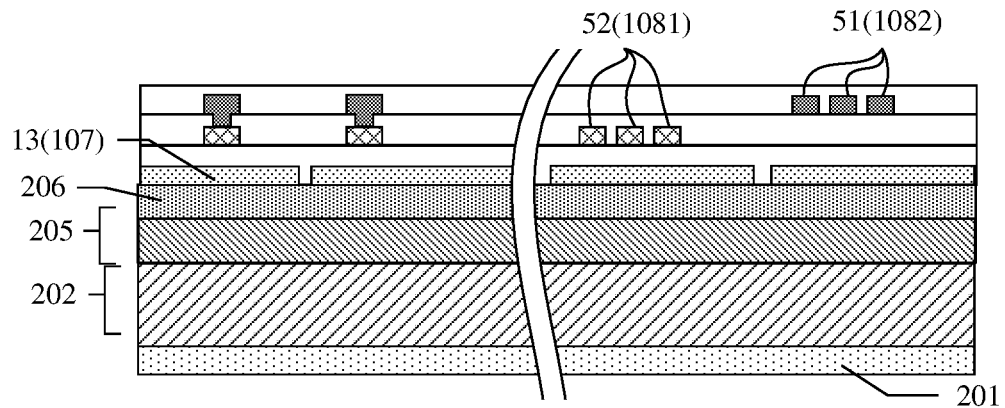
FIG. 19 is a schematic diagram of a cross section of an optional implementation of a location at a tangent line 444 in FIG. 18.

FIG. 19 is a schematic diagram of a cross section of an optional implementation of a location at a tangent line 444 in FIG. 18. As shown in FIG. 19, for example, the display panel is an organic light-emitting display panel. The display panel includes a first metal routing layer 1081 and a second metal routing layer 1082 that are located on a side that is of a touch electrode layer 107 and that is away from a packaging layer 206. In another embodiment, relative locations of the first metal routing layer 1081 and the second metal routing layer 1082 are interchangeable. As shown in the figure, jump touch signal wires outside the jump routing area (a location corresponding to the first touch electrode row 131-1 and the second touch electrode row 131-2) uses a design of a resistance reduction wire segment. After being turned for jump, three jump touch signal wires in a touch signal wire group 51 are all routed at the second metal routing layer 1082, and after being turned for jump, three jump touch signal wires in a touch signal wire group 52 are all routed at the first metal routing layer 1081. Three touch signal wires in the touch signal wire group 51 are electrically connected to touch electrodes in a same touch electrode column, and three touch signal wires in the touch signal wire group 52 are also electrically connected to touch electrodes in a same touch electrode column. According to the implementation design, jump touch signal wires that are in the jump routing area and that are electrically connected to touch electrodes in different touch electrode columns are located at different metal routing layers, so that proper routing is implemented, and a short circuit caused by crossing of the jump touch signal wires is avoided.

Figure 20:
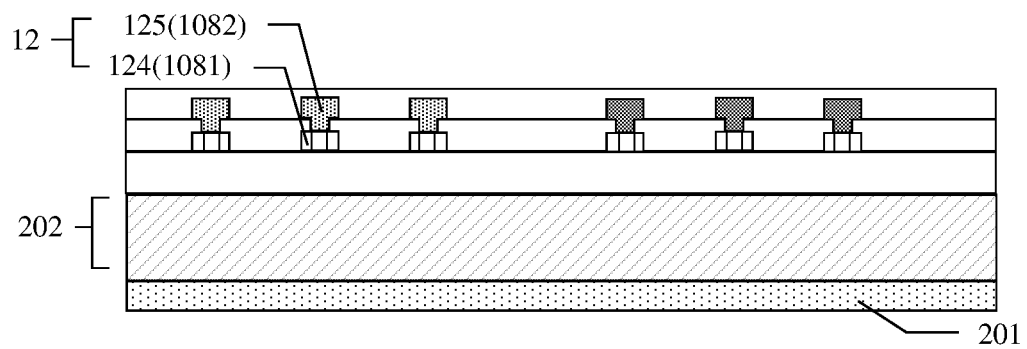
FIG. 20 is a schematic diagram of a cross section of an optional implementation of a location at a tangent line 555 in FIG. 18.

In an implementation, FIG. 20 is a schematic diagram of a cross section of an optional implementation of a location at a tangent line 555 in FIG. 18. As shown in FIG. 20, each touch leading wire 12 includes a first parallel leading wire 124 at a first metal routing layer 1081 and a second parallel leading wire 125 at a second metal routing layer 1082, and the first parallel leading wire 124 and the second parallel leading wire 125 are connected in parallel, so that resistance on the touch leading wire 12 can be reduced, a voltage drop generated when a touch signal is transmitted on the touch leading wire is reduced, thereby further reducing power loss.

In another embodiment, all touch leading wires located in a non-display area are located at a same metal layer.

Figure 21:
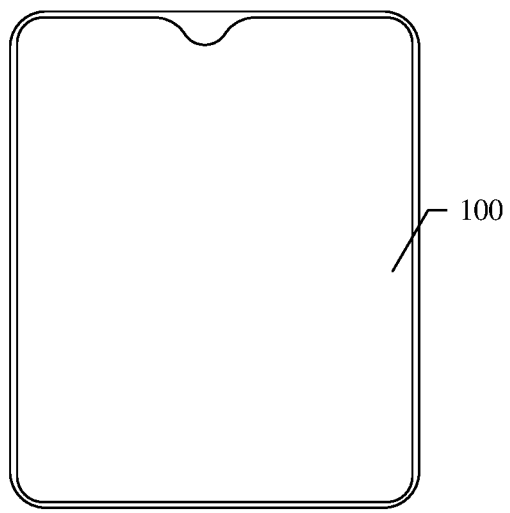
FIG. 21 is a schematic diagram of an electronic device according to an embodiment of this application.

Based on a same inventive concept, an embodiment of this application further provides an electronic device. FIG. 21 is a schematic diagram of an electronic device according to an embodiment of this application. As shown in FIG. 21, the electronic device includes the display panel 100 provided in any embodiment of this application. A specific structure of the display panel 100 has been described in detail in the foregoing embodiment, and details are not described herein again. Certainly, the electronic device shown in FIG. 21 is merely an example for description. The electronic device may be any electronic device having a display function, such as a mobile phone, a tablet computer, a notebook computer, an e-book, or a television set.

The foregoing descriptions are merely example embodiments of the present invention, but are not intended to limit the present invention. Any modification, equivalent replacement, or improvement made within the spirit and principle of the present invention should fall within the protection scope of the present invention.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of embodiments of the present invention.

What is claimed is:

1. A display panel, comprising:
a display area comprising a touch electrode array; and
a non-display area enclosing the display area;
wherein the touch electrode array comprises a plurality of touch electrodes and a plurality of touch signal wires, and wherein one touch electrode is electrically connected to at least one touch signal wire;
wherein the non-display area comprises at least two fan-out routing areas, wherein the at least two fan-out routing areas are arranged along a first boundary between the non-display area and the display area, wherein each fan-out routing area comprises a plurality of touch leading wires, and wherein the touch leading wires are electrically connected to the touch signal wires in a one-to-one correspondence;
wherein each fan-out routing area comprises a fan-shaped area and a straight line area, and wherein the fan-shaped area is located between the first boundary and the straight line area;
wherein each touch leading wire comprises a first sub-leading wire connected to a second sub-leading wire, wherein the first sub-leading wire is located in the fan-shaped area, and wherein the second sub-leading wire is located in the straight line area;
wherein a distance between two second sub-leading wires that are adjacent and that are located in different straight line areas is a first distance, a distance between two second sub-leading wires that are adjacent and that are located in a same straight line area is a second distance, and the first distance is greater than the second distance;
wherein at least some of the plurality of touch signal wires are jump touch signal wires, wherein a shape of each of the jump touch signal wires is a fold line, wherein each of the jump touch signal wires comprises a start point and an end point, wherein the start point is electrically connected to one touch electrode, and wherein the end point intersects the first boundary; and
wherein a distance between the start point and a central axis is a third distance, wherein a distance between the end point and the central axis is a fourth distance, and wherein the third distance is greater than the fourth distance.

2. The display panel according to claim 1, wherein the touch electrode array comprises a plurality of touch electrode rows and a plurality of touch electrode columns, wherein each touch electrode row comprises a plurality of touch electrodes, and wherein each touch electrode column comprises a plurality of touch electrodes; and
wherein the central axis of the display area is perpendicular to the first boundary.

3. The display panel according to claim 2, wherein the plurality of touch electrode columns comprise two edge touch electrode arrays located on edges of the touch electrode array; and wherein touch signal wires that are electrically connected to at least some touch electrodes in at least one edge touch electrode column are jump touch signal wires.

4. The display panel according to claim 3, wherein a corner of the display area close to a side of the fan-out routing area is an arc corner.

5. The display panel according to claim 3, wherein the plurality of touch electrode columns further comprise a non-edge touch electrode column, and wherein the non-edge touch electrode column is located between the two edge touch electrode columns; and wherein touch signal wires that are electrically connected to at least some touch electrodes in the non-edge touch electrode column are jump touch signal wires.

6. The display panel according to claim 2, wherein the touch electrode that is electrically connected to the start point and a touch electrode that is adjacent to the end point are located in different touch electrode columns.

7. The display panel according to claim 2, wherein the jump touch signal wire comprises at least a first wire segment, and wherein the first wire segment is not parallel to the central axis.

8. The display panel according to claim 7, wherein the first wire segment is parallel to the first boundary, and the third distance is correlated with a distance between the first wire segment and the first boundary.

9. The display panel according to claim 7, wherein the touch electrode array comprises a first touch electrode column to an Nth touch electrode column that are sequentially arranged, wherein N is a positive integer greater than or equal to 3;

wherein the first touch electrode column is parallel to the central axis, and wherein a distance between the first touch electrode column and the central axis is greater than a distance between any one of the second touch electrode column to the Nth touch electrode column and the central axis; and wherein touch signal wires that are electrically connected to a plurality of touch electrodes of an nth touch electrode column are all jump touch signal wires, wherein touch signal wires that are electrically connected to a plurality of touch electrodes of an (n+1)th touch electrode column are all jump touch signal wires, wherein an end point of the jump touch signal wire is adjacent to an (n+2)th touch electrode column, and wherein n is an odd number, and n<N.

10. The display panel according to claim 9, wherein a first touch electrode row in the plurality of touch electrode rows is adjacent to a second touch electrode row in the plurality of touch electrode rows, and wherein the first touch electrode row is adjacent to the first boundary;

wherein first wire segments of the jump touch signal wires that are respectively electrically connected to the plurality of touch electrodes of the nth touch electrode column overlap the second touch electrode row; and wherein first wire segments of the jump touch signal wires that are respectively electrically connected to the plurality of touch electrodes of the (n+1)th touch electrode column overlap the first touch electrode row.

11. The display panel according to claim 7, wherein at least one of:

the jump touch signal wire further comprises a second wire segment and a third wire segment that are parallel to the central axis, wherein two ends of the first wire segment are respectively connected to one end of the second wire segment and one end of the third wire segment, and wherein the other end of the second wire segment is the start point, and the other end of the third wire segment is the end point; and the jump touch signal wire further comprises a fourth wire segment that is parallel to the central axis, wherein one end of the first wire segment is the start point, wherein the other end of the first wire segment is electrically connected to one end of the fourth wire segment, and wherein the other end of the fourth wire segment is the end point.

12. The display panel according to claim 1, wherein the display panel further comprises a substrate layer and a metal routing layer located above the substrate layer, and wherein the metal routing layer comprises a first metal routing layer and a second metal routing layer; and wherein at least some of the plurality of touch signal wires comprise a resistance reduction wire segment, wherein the resistance reduction wire segment comprises a first sub-wire segment and a second sub-wire segment that are connected in parallel, and wherein the first sub-wire segment and the second sub-wire segment are respectively located at the first metal routing layer and the second metal routing layer.

13. The display panel according to claim 12, wherein the display panel further comprises a thin film transistor array layer, a display layer, a packaging layer, and a touch electrode layer that are sequentially arranged above the substrate layer, wherein the touch electrode array is located at the touch electrode layer, and wherein a metal wiring layer is located on a side that is of the touch electrode layer and that is away from the packaging layer.

14. The display panel according to claim 1, wherein a shielded signal wire that is adjacent to the touch leading wire is disposed outside each fan-out routing area.

15. The display panel according to claim 1, wherein the non-display area further comprises a bending area, wherein a bending axis of the bending area is parallel to the first boundary, and wherein the second sub-leading wire passes through the bending area in a direction perpendicular to the first boundary.

16. An electronic device, comprising a display panel, wherein the display panel comprises:

a display area comprising a touch electrode array; and
a non-display area enclosing the display area;
wherein the touch electrode array comprises a plurality of touch electrodes and a plurality of touch signal wires, and wherein one touch electrode is electrically connected to at least one touch signal wire;

wherein the non-display area comprises at least two fan-out routing areas, wherein the at least two fan-out routing areas are arranged along a first boundary between the non-display area and the display area, wherein each fan-out routing area comprises a plurality of touch leading wires, and wherein the touch leading wires are electrically connected to the touch signal wires in a one-to-one correspondence;

wherein each fan-out routing area comprises a fan-shaped area and a straight line area, and wherein the fan-shaped area is located between the first boundary and the straight line area;

wherein each touch leading wire comprises a first sub-leading wire connected to a second sub-leading wire, wherein the first sub-leading wire is located in the fan-shaped area, and wherein the second sub-leading wire is located in the straight line area; and wherein a distance between two second sub-leading wires that are adjacent and that are located in different straight line areas is a first distance, wherein a distance between two second sub-leading wires that are adjacent and that are located in a same straight line area is a second distance, and wherein the first distance is greater than the second distance;

wherein at least some of the plurality of touch signal wires are jump touch signal wires, wherein a shape of each of the jump touch signal wires is a fold line, wherein each of the jump touch signal wires comprises a start point and an end point, wherein the start point is electrically connected to one touch electrode, and wherein the end point intersects the first boundary; and wherein a distance between the start point and a central axis is a third distance, a distance between the end point and the central axis is a fourth distance, and the third distance is greater than the fourth distance.

17. The electronic device according to claim 16, wherein the touch electrode array comprises a plurality of touch electrode rows and a plurality of touch electrode columns, wherein each touch electrode row comprises a plurality of touch electrodes, and wherein each touch electrode column comprises a plurality of touch electrodes; and wherein the central axis of the display area is perpendicular to the first boundary.

18. The electronic device according to claim 17, wherein the plurality of touch electrode columns comprise two edge touch electrode arrays located on edges of the touch electrode array; and wherein touch signal wires that are electrically connected to at least some touch electrodes in at least one edge touch electrode column are jump touch signal wires.

19. The electronic device according to claim 18, wherein a corner of the display area close to a side of the fan-out routing area is an arc corner.

20. The electronic device according to claim 18, wherein the plurality of touch electrode columns further comprise a non-edge touch electrode column, and wherein the non-edge touch electrode column is located between the two edge touch electrode columns; and wherein touch signal wires that are electrically connected to at least some touch electrodes in the non-edge touch electrode column are jump touch signal wires.

* * * * *